Feb. 9, 1926. 1,572,576
J. B. THOMAS
TRANSMISSION
Filed Feb. 18, 1924 3 Sheets-Sheet 1
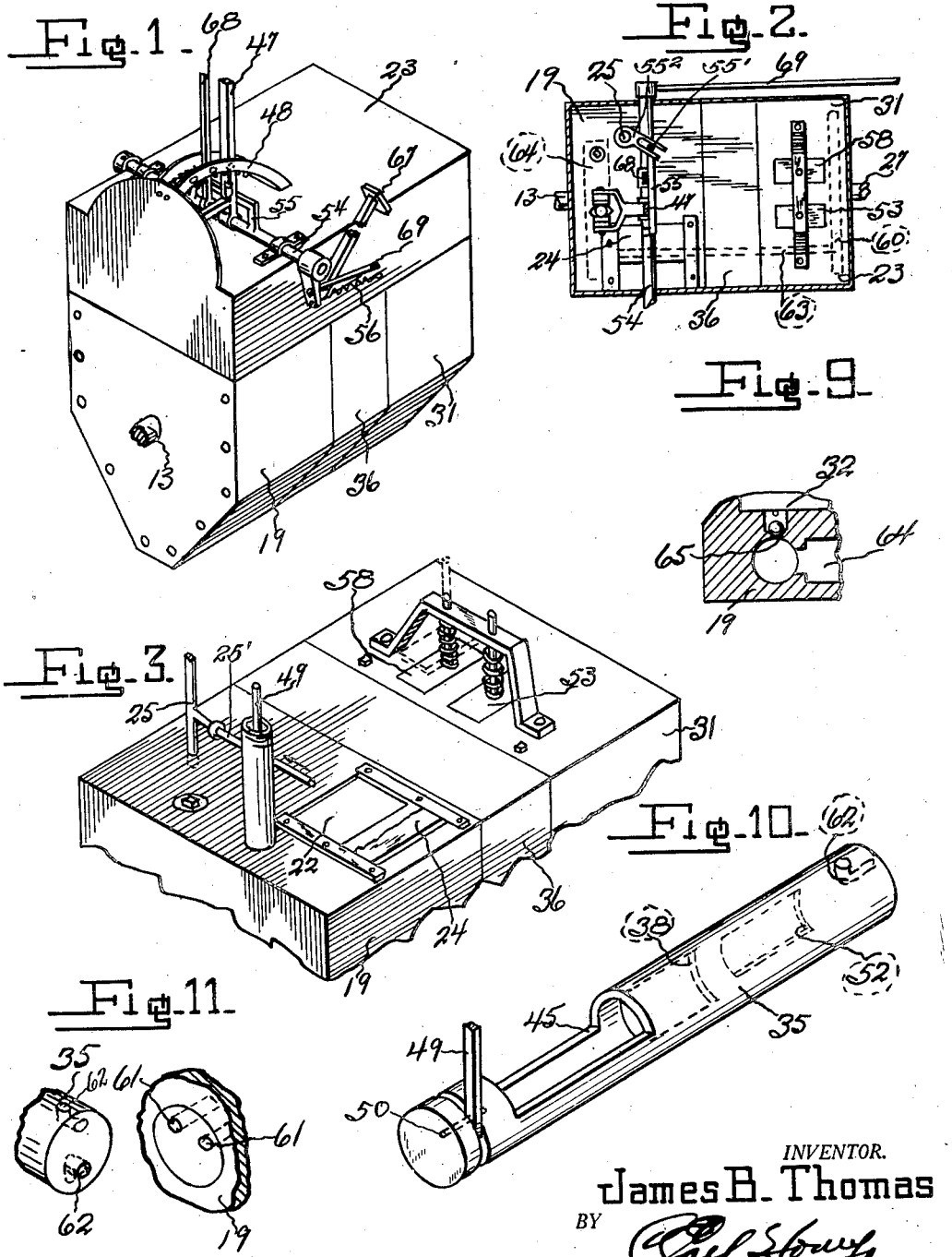
INVENTOR.
James B. Thomas
BY
ATTORNEY.

Feb. 9, 1926.  
J. B. THOMAS  
TRANSMISSION  
Filed Feb. 18, 1924  3 Sheets-Sheet 2  
1,572,576

INVENTOR.  
James B. Thomas  
BY  
ATTORNEY.

Feb. 9, 1926. 1,572,576
J. B. THOMAS
TRANSMISSION
Filed Feb. 18, 1924   3 Sheets-Sheet 3
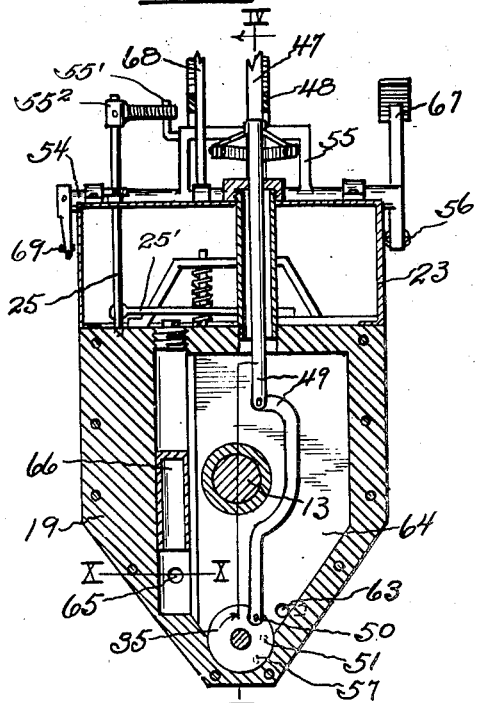
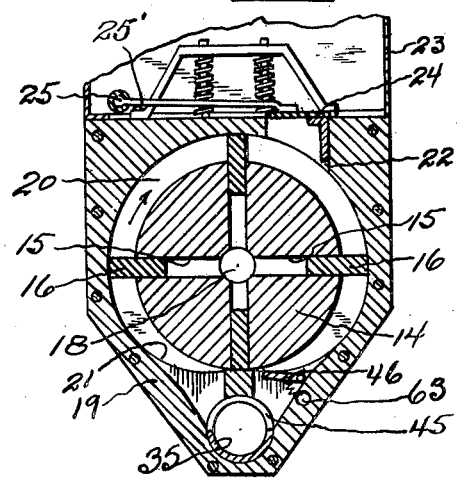
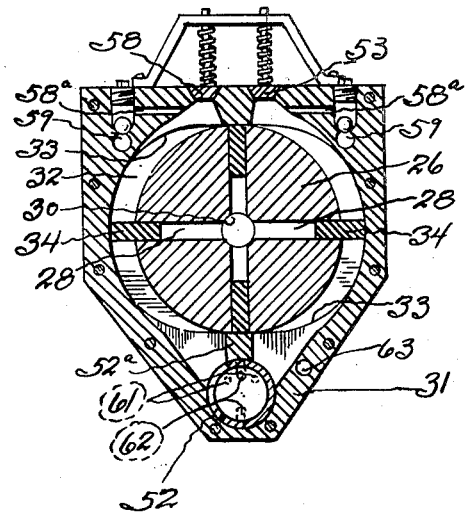
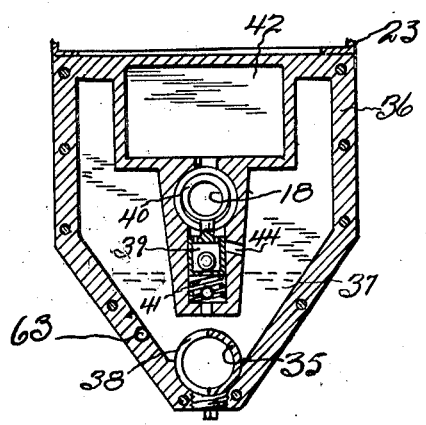
INVENTOR.
James B. Thomas
ATTORNEY.

Patented Feb. 9, 1926.

1,572,576

UNITED STATES PATENT OFFICE.

JAMES B. THOMAS, OF BLAIRSTOWN, MISSOURI.

TRANSMISSION.

Application filed February 18, 1924. Serial No. 693,515.

*To all whom it may concern:*

Be it known that I, JAMES B. THOMAS, a citizen of the United States, residing at Blairstown, in the county of Henry and State of Missouri, have invented a new and useful Transmission, of which the following is a specification.

This invention relates to transmissions, and particularly to transmissions in which fluid, such as oil, is used as an element for imparting the power of the motor to the drive shaft.

A primary object of this invention is the provision of a transmission which is made up in units adapted to be bolted together and to contain the various parts necessary in carrying out this invention.

Another object of this invention is the provision of novel wheels, formed integrally with the drive and driven shafts which carry slidably mounted lugs for engaging the fluid used.

A still further object of this invention is to provide a means within the transmission and driven by the drive shaft for maintaining a constant and predetermined pressure behind said slidably mounted lugs.

An even further object of the invention is the provision of a rotary valve positioned beneath the lug carrying wheels for selectively imparting forward or reverse motion to the driven shaft.

With these general objects in view, as well as minor objects which will appear in the course of the detailed description, the invention will now be described with reference to the accompanying drawings, in which:

Figure 1 is a perspective view of the assembled transmission showing the operating means therefor.

Fig. 2 is a plan view of the same with the top of the reservoir broken away to reveal parts contained therein.

Fig. 3 is a perspective view of the transmission with the reservoir entirely removed.

Fig. 5 is a cross section of the same taken on line V—V of Fig. 4.

Fig. 6 is another cross section of the transmission taken on line VI—VI of Fig. 4 and showing the lug depressing frame in an operating position.

Fig. 7 is still another section of the device taken on line VII—VII of Fig. 4.

Fig. 8 is a similar section taken through the driven wheel on line VIII—VIII of Fig. 4.

Fig. 9 is a fragmentary detail section of the ball valve taken on line X—X of Fig. 5.

Fig. 10 is a perspective view of the controlling valve showing the manner in which parts are cut away to direct the flow of fluid, and;

Fig. 11 is a detail view of one end of the valve, showing the two passages which register with valve passage when the valve is in a forward and reverse position.

Figure 4:
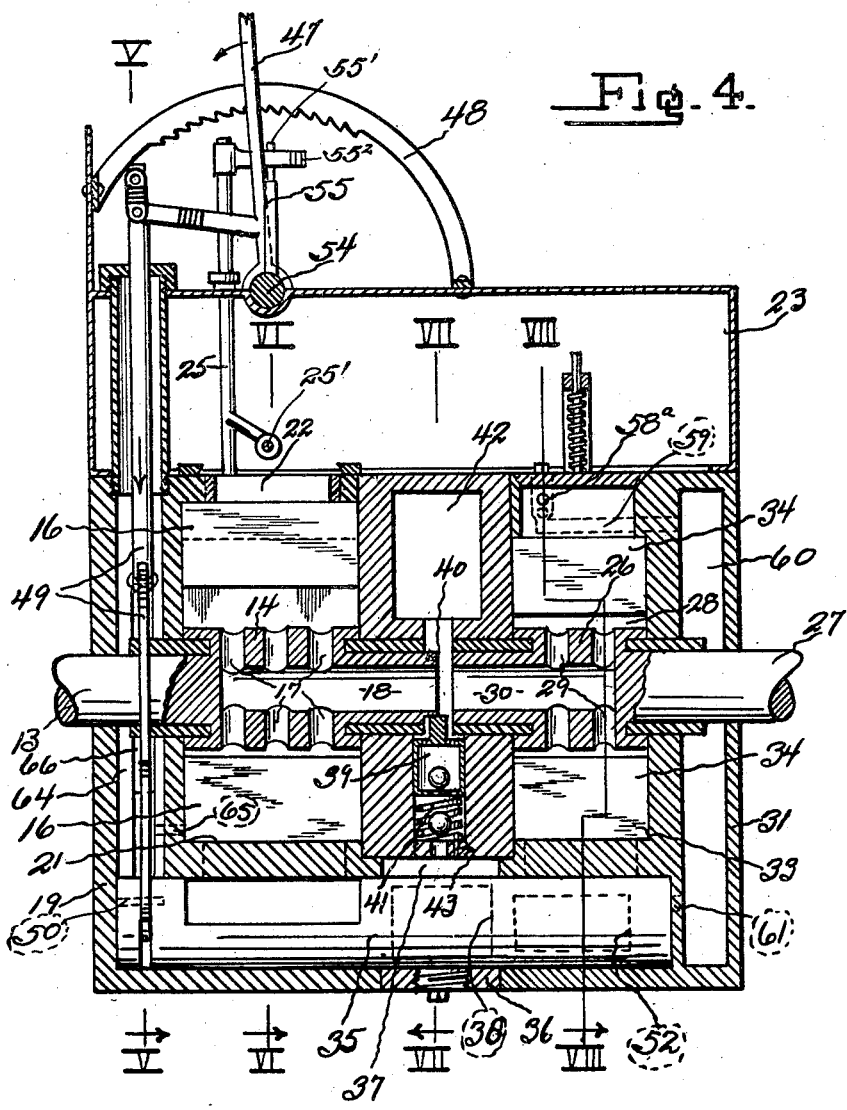
Fig. 4 is a vertical central section of the assembled transmission taken along line IV—IV of Fig. 5.

Referring to the drawings in detail, wherein similar reference characters refer to like parts throughout the several views, and wherein 13 designates a drive shaft operated from an internal combustion engine or other source of power not here shown. A wheel 14 formed integrally with shaft 13 is provided with a plurality of radially extending slots 15 adapted to slidably support lugs 16, while passages 17 connect slots 15 with hollow portion 18 of shaft 13 to permit of the flow of fluid to a point behind lugs 16.

This wheel 14 is housed within a block 19 having a cavity 20 therein, the walls of which form a cam surface 21 over which the outer edges of lugs 16 slide as wheel 14 is turned.

A port 22 forming a passage between cavity 20 and a suitable reservoir 23, preferably placed above the housing, permits the flow of fluid when sliding cover 24 is operated by any suitable means such as 25.

A driven wheel 26 constructed similarly to wheel 14 is formed integrally with driven shaft 27. It, likewise, is provided with radially extending slots 28 and passages 29 which connect slots 28 with hollow portion 30 of shaft 27. Housing 31 within which wheel 26 rests, also has a cavity 32 having an inner surface forming cams 33 over which the outer edges of lugs 34 slide when the underlying valve 35 is in the forward or reverse positions.

An intermediate housing 36 forms a chamber 37 which always contains fluid supplied through openings 38 of valve 35. To maintain a constant pressure behind lugs 16 and 34, a small pump 39 is mounted adjacent the inner end of shaft 13, and forced down in its action by cam 40 formed on said shaft. A coil spring 41 beneath pump 39 forces it up, and is only strong enough to hold the pressure required behind the lugs, which is greater than the pressure found elsewhere, equal to the strength of said spring. When the motor is started, the pump 39 develops enough pressure behind the lugs to hold them out against the inner surface 33 of the wheel housings. When the maximum pressure is reached, spring 41 fails to lift pump 39, and it does not operate until the pressure diminishes. An air cushion is formed in the upper part of cavity 42, and tends to equalize the pressure behind lugs 34 and 16.

When the pressure on the fluid between wheels 14 and 26 decreases (as when coasting down a hill) the pressure behind lugs is decreased through allowing fluid to drain out through a very small hole 43. The fluid pressure above then forces pump 39 down past opening 44, and the fluid from behind lugs escapes through this opening until spring 41 is again able to lift pump 39 and close the opening 44. This action equalizes the entire fluid pressure.

In the illustration, the transmission is shown in a neutral position, wheel 14 is traveling in the direction of the arrow (Fig. 6) and lugs 16 are not being supplied with fluid from reservoir 23. Segmental opening 45 of valve 35 permits fluid to pass entirely around wheel 14, and flap valve 46 precludes its backing up. Wheel 26 is not being rotated.

To place the transmission in a forward position, lever 47 is pushed forward to a point which may be indicated on segment 48 by any suitable means not here shown. This forces links 49 downwardly, and rotates valve 35 in the direction of the arrow shown in Fig. 5 for approximately one-sixth of the distance around valve 35 or until point 50, at the lower end of link 49, positions itself at point 51. This action places segmental opening 52 to the left of partition 52$^a$ (Fig. 8) and the fluid passes upwardly against lugs 34 and out valve 58 into reservoir 23. It will be noted from the construction (Fig. 1) that shaft 54 has an arch 55, which operates valve operating means 25 when shaft 54 is rotated. Spring 56 keeps arch 55 in a follow-up position with lever 47, and as lever 47 is pushed forward, valve cover 24 is opened to permit the inflow of fluid to chamber 20, where it is forced down and back through valve 35 to operate wheel 26 in the desired direction.

To position the transmission in reverse, lever 47 is pushed still farther forward, and valve 35 rotated to a point where segmental opening 52 is on the right of partition 52$^a$ (Fig. 8) and point 50 is at point 57 (Fig. 5). Fluid under the pressure of wheel 14 passes to the right of wheel 26 and out valve 53. The cam surface of cavities 32 and 20 guide lugs 34 and 16 in and out of their respective wheels to engage the fluid when most needed.

Air ducts 58$^a$ opening into chamber 32 on either side of the center of wheel 26 and at the top of the cavity, lead through a ball valve to passages 59, which in turn empty into chamber 60, formed within housing 31. These ducts will permit an inflow of air behind lugs 34 when necessary, but will not allow oil to escape. A drain for this cavity 32 is also provided at the bottom in valve 35. Openings 61 positioned on each side of the center, and passing through to chamber 60, register with angular passage 62 provided in valve 35 for that purpose. When the valve is in a forward position, any fluid escaping to the chamber behind lugs 34, enters passage 62 which is then registering with opening 61 to the right of center (Fig. 8) and flows into chamber 60. The hole to the left of center is utilized when the transmission is in a reverse position. A longitudinal conduit 63 formed within each block or housing conveys excess fluid back to a similar chamber 64, formed within housing 19.

The fluid collects in this chamber until such time as it reaches a level slightly above passage 65. Float 66 which normally closes this passage is then lifted above it and permits fluid to enter chamber 20, where it is again carried back to reservoir 23 through valve 58. A ball valve keeps the fluid from passing back to chamber 64.

When lever 47 is at either reverse or forward, and a slight increase of power is needed, it may be procured by pressing foot pedal 67. This action tends to close valve cover 24 by means of connections which are moved as follows: arch 55, rigidly attached to shaft 54 moves rearwardly through the arc of a circle having its axis at shaft 54, upwardly extending pin 55' engages bifurcated member 55$^2$ to form a loose joint, as shown in Figs. 2, 4 and 5. The rearward pull exerted through this loose joint to operating member 25, causes the link 25', attached to cover 24, to move in the direction of the arrow shown in Fig. 3 which allows the driving motor to develop more pressure through valve 35 to wheel 26. A brake lever 68 may also be provided. It is preferably loosely mounted on shaft 54 and, when set i. e. pulled rearwardly against arch 55, actuates brake rod 69 which may be attached through any suitable means to shaft 54 as clearly shown in Figs. 1, 2 and 5 and closes valve cover 24 through the same linkage, starting with pin 55' as above set forth.

Changes in details and constructive materails may be made without departing from the spirit of the invention, and the right to make all such formal changes, as may fairly fall within the scope of the claims, is reserved.

The operation of the transmission has been made clear throughout the description.

Claims:

1. In a transmission, a drive shaft hollow for a portion of its length, a driven shaft hollow for a portion of its length, a wheel integral with each shaft having a plurality of radially disposed slots and passages, said passages forming connections between the hollow of said shaft and said slots, lugs slidably mounted in said slots, cam guide faces for engaging the outer edges of said lugs, means operable by said drive shaft for maintaining fluid under pressure within the hollow shafts and against said lugs and a fluid valve interconnecting the wheels of said drive and driven shaft.

2. In a transmission, a drive shaft hollow for a portion of its length having a cam surface formed thereon adjacent its inner end, a driven shaft hollow for a portion of its length in axial alinement therewith, said shafts having their inner ends terminating within a pump chamber, a wheel integral with each shaft having a plurality of radially disposed slots and passages, said passages forming connections between the hollow of said shaft and said slots, lugs slidably mounted in said slots, cam guide faces engaging the outer edges of said lugs, a valve interconnecting the wheels of said drive and driven shafts, and a pump operated by the cam surface of said drive shaft whereby fluid is maintained under pressure within the hollow shafts, and said lugs are forced outwardly in constant engagement with said cam guide faces.

3. In a transmission, a drive shaft hollow for a portion of its length, a driven shaft hollow for a portion of its length in axial alinement therewith, means between the inner ends of said shafts for maintaining a fluid under pressure within said shafts, whereby lugs carried by said shafts are forced outwardly from the center thereof, said means being operated by a cam integral with said drive shaft.

4. In a transmission, a drive shaft hollow for a portion of its length, a driven shaft hollow for a portion of its length in axial alinement therewith, means adjacent the inner ends of said shafts for maintaining a fluid under pressure within said shafts, wheels carried by each of said shafts having slidably mounted fluid engaging lugs, said lugs being held in operative position by said fluid under pressure, a hollow rotary valve adapted to carry fluid forced therein by the lugs of said drive shaft wheel to said driven shaft wheel, whereby said driven shaft wheel may be given rotary motion in either direction.

5. In a transmission, a drive shaft provided with a wheel adjacent its inner end, a plurality of slidably mounted lugs carried by said wheel and adapted to draw fluid from a reservoir, a driven shaft also provided with a wheel adjacent its inner end having a plurality of slidably mounted lugs carried thereby, common means for maintaining fluid under pressure behind said lugs and selective means for conveying fluid driven by the lugs of said drive shaft to said driven shaft wheel whereby the force may impart rotary motion in either direction and means for carrying said fluid back to said reservoir.

6. In a transmission, a drive shaft provided with a wheel adjacent its inner end, a plurality of slidably mounted lugs carried by said wheel, a housing for the wheel, a cam surface formed by the inner surface of said housing at the bottom thereof, means for admitting fluid to said housing, a driven shaft having a wheel adjacent its inner end, a plurality of slidably mounted lugs carried by said wheel, a housing for the driven shaft wheel, cam surfaces formed by the inner surfaces of said housing at the top and bottom thereof, means for permitting the escape of fluid from said housing, a fluid pump operated by a cam on the inner end of said drive shaft for supplying fluid under pressure to the inner edges of the lugs for maintaining the outer edges of said slidably mounted lugs in contact with the cam surfaces of their respective housings and means connecting said wheels for controlling the flow of fluid from one to the other.

7. In a transmission, a drive shaft, a wheel integral therewith provided with a plurality of radially extending lugs slidably mounted therein and normally held out for pumping fluid to a similar driven shaft wheel, a housing for said wheels having its opposite walls provided with a chamber for catching escaping oil, said chambers being interconnected by a conduit formed by said housing and means within one of said chambers for controlling the flow of oil back to the source of supply, substantially as described.

8. In a transmission, a drive shaft, a driven shaft, a cam carried by the inner end of said drive shaft, each of said shafts being hollow for a portion of their length and open at their inner ends, said inner ends terminating in a pump and equalizing chamber, wheels integral with each shaft having slidably mounted lugs and passages joining the lug slots with the hollow of said shaft, a hollow rotary valve adapted to carry fluid forced therein by the lugs of said drive shaft wheel to said driven shaft wheel, and means operable by the cam of said drive shaft for maintaining fluid under predetermined pressure behind said lugs.

9. In a transmission, a drive shaft, a driven shaft, wheels integral with each of said shafts, lugs slidably mounted in slots formed in each of said wheels, a fluid valve connecting said wheels, a housing for said wheels forming a cavity between said wheels and passages connecting the inner edges of said lug slots and said cavity, a pump adapted to supply fluid under pressure to said lug slots and said cavity receiving excess fluid and always having an air cushion in the upper portion thereof, whereby oil pressure behind said lugs is equalized.

10. In a transmission, a drive shaft, a driven shaft, wheels integral with each of said shafts, lugs slidably mounted in each of said wheels, a housing for said wheels forming a cavity between said wheels, a fluid valve connecting said wheels having an opening communicating with said cavity, a pump and valve between said connecting valve and said cavity and means for disposing said pump in the operative position when the fluid pressure falls below a predetermined point whereby a constant pressure is maintained behind the lugs of said wheels.

JAMES B. THOMAS.